C. S. AYRES.
SIGHT INDICATOR FOR DISPENSING PUMPS.
APPLICATION FILED JULY 17, 1919.
1,345,733.
Patented July 6, 1920.
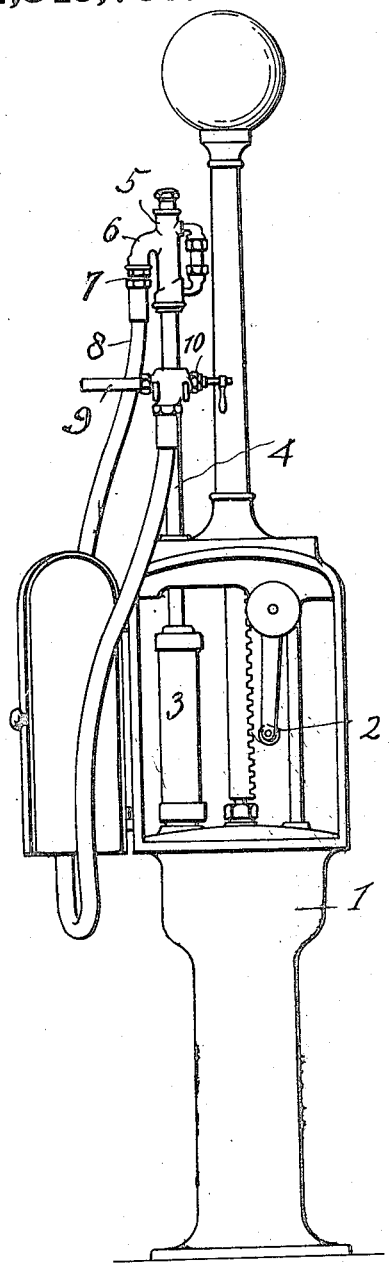
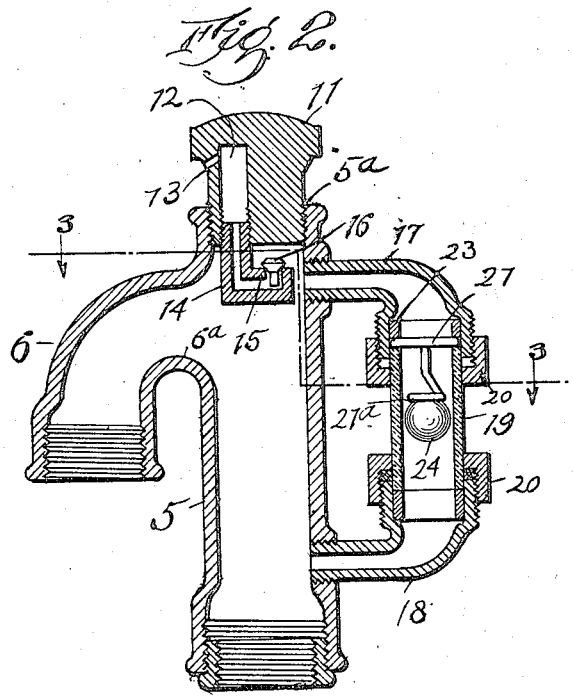
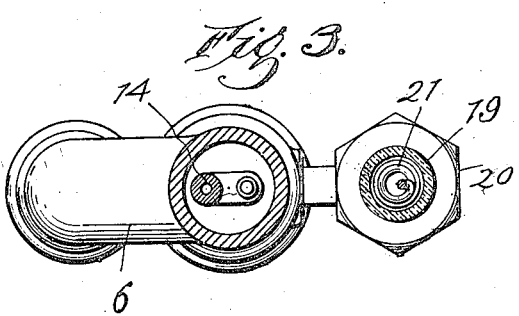
Inventor
Charles S Ayres
By Thurston Kwis + Hudson
Attys.

UNITED STATES PATENT OFFICE.

CHARLES S. AYRES, OF RIVERTON, NEW JERSEY.

SIGHT-INDICATOR FOR DISPENSING-PUMPS.

1,345,733.   Specification of Letters Patent.   Patented July 6, 1920.

Application filed July 17, 1919. Serial No. 311,555.

*To all whom it may concern:*

Be it known that I, CHARLES S. AYRES, a citizen of the United States, residing at Riverton, in the county of Burlington and State of New Jersey, have invented a certain new and useful Improvement in Sight-Indicators for Dispensing-Pumps, of which the following is a full, clear, and exact description.

The present invention relates to pumps, more particularly to that class of pumps which may be termed dispensing pumps, such as employed to dispense certain commodities as gasolene, oil, etc., in measured amounts.

More particularly, the invention provides a construction by which it may be determined at a glance whether the pump is in primed condition and if it is not in such condition, the construction provided serves to indicate when the pump is brought to primed condition.

To the above ends, my invention consists of a novel indicating device for visually informing the observer whether a measuring pump is in condition to commence delivery at the first movement of the handle, the same comprising a transparent tubular member which is collocated with a fixture carried on or forming a continuation of the stand pipe of the pump, so that not only is said tubular member or gage glass on substantially the same level as the level of the fluid which is being dispensed by the pump in operation, or a little below said level, but, in addition, said gage glass is provided with an indicating float and a stop therefor, which will arrest the upward movement of said float and bring it to rest at a point slightly below the neck of the outlet elbow, said float in this position being visible, thereby indicating that the pump is in primed condition and ready to deliver a full measured quantity the instant the handle and the pumping piston start, it being apparent that when the float drops from its predetermined arrested highest position, it will indicate that the pump has lost its prime and that the fluid contained in the outlet or stand pipe and in the outlet fixture has dropped below the proper level, said indicating float being then in the lower portion of the transparent tube and invisible to the observer.

To the above ends, my invention consists in the novel combination of a transparent gage glass, a float therein and a float arresting means, said gage glass, float and arresting means being collocated and positioned in a novel manner with respect to the outlet fixture of the pump, and particularly with respect to the neck of the outlet elbow, whereby it will be indicated whether or not the delivery of the liquid will commence the instant the handle is started and stopped immediately with the handle, since otherwise the quantity delivered will not be accurate.

My novel device therefore comprises means for visually indicating whether a measuring pump is in position to commence delivery at the first movement of the handle, the indicating float acting in one direction when the pump is full, and in another direction when it is not full, and it being not necessary to cause gasolene to flow past that indicating point in order to get an indication.

For the purpose of illustrating my invention, I have shown in the accompanying drawings, forms thereof which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 shows in elevation a dispensing pump equipped with the present invention.

Fig. 2 represents a sectional elevation of a portion of the apparatus shown in Fig. 1.

Fig. 3 is a section upon the line 3—3 of Fig. 2.

One of the principal faults of measuring dispensing pumps at present in use, is that due to faulty valves which are used in connection with the pump, it is quite impossible to hold the pump in primed condition for any extended period of time.

Where the pump loses its prime, the gasolene or other commodity which is measured and dispensed by the pump, drips back into the tank or container with which the pump is associated and therefore after such an occurrence the first measured quantity which is pumped is short in measure so that the customer does not receive the full amount of the commodity which he is supposed to have purchased.

Furthermore, at times it happens that the tank, from which the commodity being dispensed is drawn, becomes empty and without the knowledge of the operator of the pump or the purchaser, the pump itself pumps more or less air so that in such an instance the purchaser receives short measure.

The purpose of the present invention is to provide a construction for the above mentioned class of pumps which will obviate such occurrences as above mentioned, because there will at all times be a visible indication of the condition of the pump.

Referring to the drawing, 1 indicates a standard such as is commonly used on streets and in garages for dispensing gasolene or oils. The standard contains a pump which is operated by a handle 2 and the pump is supplied from a tank which is not shown. The pump communicates with a stand pipe 4 which at its upper end is provided with a fitting 5 which latter forms an upward extension or continuation of said stand pipe and conveys the fluid to be pumped and measured to an outlet or elbow 6 which is threaded and receives the coupling 7 of a hose 8 which at its outer end is provided with a pipe 9 controlled by a valve 10. This last mentioned valve may or may not be used as occasion requires.

The fitting 5 at its upper end is provided with a threaded opening $5^a$ which receives a plug 11. This plug has a recess portion 12 which has a small hole 13, by which the recess 12 is vented. There is a pipe 14 which is threaded into the lower end of the opening 12 in the plug 11 and this pipe has an opening 15 which receives the small valve 16.

The construction which has just been described is for the purpose of allowing the hose 8 to drain when the pumping action has been stopped as it will be apparent that otherwise the vacuum formed inside of the fixture 5 will prevent the complete discharge of gasolene from the pipe 8.

In connection with the fixture 5 there is adjacent one end thereof an elbow 17 which is tapped into said fixture so that the interior of the elbow communicates with the interior of the fixture. At the lower end of the fixture 5 there is an elbow 18 which is tapped into the fixture 5 so as to communicate in the interior thereof. These elbows have ends which are opposite each other and between the said ends there is a glass tube 19 which is held in place by means of gland nuts 20 which assisted by suitable packing prevent the escape of gasolene vapor around the ends of the tube 19.

Adjacent one end of the tube there is a member 21 which preferably is formed of wire. This member has a portion which extends transversely in the tube 19 and is held with respect to the tube by means of a ring or member 23 which fits inside of the head of the elbow 17. At its lower end the member 21 has a ring portion $21^a$ which is adapted to receive and position a float ball 24.

As will be observed, the interior of the elbow 17 and 18 as well as the interior of the gage pipe 19 form a continuous chamber which is connected with the interior of the fixture 5.

The portion $21^a$ of member 21 is so placed that the float ball is in engagement therewith and its upward movement arrested thereby when the level of the fluid which is being dispensed by the pump is slightly below the neck $6^a$ of the elbow 6 because when this condition obtains the pump is in primed condition and ready to deliver a full measured quantity upon the next operation of the pump.

If the pump loses its prime and the fluid within the pipe 4 and the fixture 5 drops below the proper level, the float 24 descends in the tube 19 and if the level of fluid descends sufficiently, the ball 24 passes to the lower portion of the tube 19 and out of the sight of the observer.

If this condition obtains when it is desired to operate the pump to deliver a measured quantity of fluid, the pump may be preliminarily operated to a slight degree, in order to pump a small amount of fluid, sufficient to raise the float 24 into engagement with the ring $21^a$ in which condition the pump is properly primed and will deliver the quantity of fluid which it is rated to deliver.

It will be obvious that in the event that during the pumping operation, the tank from which the fluid is supplied becomes empty, the float 24 will drop to the lower end of the tube 19 and hence will indicate that fluid is not being pumped.

It will be understood from the foregoing that in a measuring pump, delivery of the liquid should commence the instant the handle is started and stopped immediately with the handle, else the quantity delivered will not be accurate, and that my novel device furnishes means for indicating instantly to the observer whether or not a measuring pump is in condition to commence delivery at the first movement of the handle, the float in my device being visible and arrested at a predetermined point in its upward movement, so that the parts appear as seen in Fig. 2 when the pump is full or primed, and that when the pump is not full, the indicating float 24 will drop to the lower portion of the transparent tube 19 out of the field of vision of the observer, it being apparent that in my device it is not necessary to cause gasolene to flow in order to get an indication.

I desire therefore to call special attention to the feature of collocating the transparent tube 19, the indicating float and its arresting device at substantially the point indicated in Fig. 2 at a point in proximity to or below the horizontal plane of the neck 6ª, it being apparent that said indicating float is arrested in its highest position and preferably at a point slightly below the level of the fluid which is being dispensed by the pump, said point being slightly below said neck 6ª of the outlet elbow 6, thereby indicating that when this condition exists, the pump is in primed condition and ready to deliver a full measured quantity upon the instant the handle 2 is started.

I am aware that it has heretofore been proposed in the patent to Hatmaker, No. 1,287,985 to employ a rotary vane, which is adapted to afford a visible indication of the passage of gasolene through a stand pipe from the pump, said vane being only operative when gasolene is passing therethrough and not moving or becoming operative except when gasolene is in motion or flowing, so that when the Hatmaker pump is standing full, the performance of his vane will be exactly the same as when the pump is standing empty.

My invention is differentiated from said Hatmaker device, since I have devised means for determining whether a measuring pump is in condition to commence delivery at the first movement of the handle, and in my device it is not necessary to cause the gasolene to flow in order to get an indication, since by reason of my novel collocation of the transparent tube, the indicating float and the arresting device 21ª with respect to the stand pipe fixture and more particularly with respect to the level of the liquid to be measured flowing over the neck 6ª, I have provided novel means comprising the indicating float and its adjuncts and collocate such means with respect to the stand pipe fixture and the neck 6ª in such a way that if such float is not visible before the operator starts pumping, the purchaser knows that the pump is not primed, and can insist that the pump be initially operated before he is served so as to insure the delivery to him of the purchased amount of gasolene.

I am also aware of the patent to Haines, No. 958,919 wherein is shown a sight gage having a mark to show the level of the seat of the outlet controlling valve. My device is differentiated from said Haines patent by the employment of my indicating float and its arresting device collocated substantially at the point and in the manner described, as it is well-known to those skilled in the art that gasolene is a transparent liquid and it is exceedingly difficult to detect its presence in a glass tube, which is particularly true when after use the sediment from the pump adheres to the inner periphery of said tube and coats the same with a film obscuring the passage of light, under which circumstances it is practically impossible to detect the presence of a column of gasolene, and it is therefore essential in a commercial and practical device of this character, to employ an indicating float having its upward movement arrested in substantially the manner and at the point hereinabove described, it being apparent that if the glass in said Haines or Hatmaker devices became clouded with dirt, it would be impossible to tell whether or not gasolene were present just prior to starting the pump, all of which disadvantages are obviated by my device.

It will now be apparent that I have devised a novel and useful sight indicator, which embodies the features of advantage enumerated as desirable in the statement of the invention and the above description, and while I have in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having described my invention, I claim—

1. In a device of the character stated, the combination with the stand pipe of a measuring pump, of a discharge outlet having a neck, a transparent tube in communication with said stand pipe at points in proximity to said neck, an indicating float in said tube, and means for arresting the upward movement of said float at a point in proximity to the horizontal plane of said neck whereby said float is visible at a point in proximity to the level of said neck, thereby indicating the primed condition of said pump.

2. In a device of the character stated, the combination of a measuring pump, a stand pipe therefor having a discharge outlet, an elbow connecting with the interior of said stand pipe below said discharge outlet, a second elbow connecting with said stand pipe above said discharge outlet, a transparent tube having its ends secured in the juxtaposed ends of said elbows, an indicating float contained within said transparent tube, and an arresting device for said float arranged within said transparent tube so as to arrest the upward movement of said float at a point slightly below the discharge neck of said stand pipe outlet.

3. As an improved article of manufacture, a fitting adapted to be attached to the stand pipe of a measuring pump and comprising an upright portion 5 and a discharge outlet 6 having a neck 6ª, elbows located above and below said neck, a transparent tube having its ends seated in said elbows, an indicating float contained in said transparent pipe, and an arresting device carried in said transparent pipe and having its lower portion terminating at a point slightly below said neck 6ª.

4. As an improved article of manufacture, a fitting adapted to be attached to the stand pipe of a measuring pump, and comprising an upright portion 5 and a discharge outlet 6 having a neck 6ª, elbows located above and below said neck, a transparent tube having its ends located in said elbows, a float in said tube, and a float arresting device having its lower portion terminating at a point below said neck and its upper portion secured at the upper end of said transparent tube.

5. As an improved article of manufacture, a fitting for a liquid measuring pump comprising the tubular portion 5 communicating with the discharge elbow 6 having the neck 6ª, an elbow 18 connected with the interior of said tubular portion 5 below said discharge elbow, a second elbow 17 connected with said stand pipe above said discharge elbow, a transparent tube having its ends secured in said elbows, an indicating float contained within said tube, a float arresting device within said tube located at a point slightly below the horizontal plane of said neck 6ª, a plug 11 located in the upper end of said fitting and having a passage 12 therein provided with a vent hole 13, said passage 12 having a pipe 14 therein provided with an outlet in its lower portion, and a check valve seated in said outlet.

In testimony whereof, I hereunto affix my signature.

CHARLES S. AYRES.